(12) United States Patent  
Gros

(10) Patent No.: US 7,730,659 B1
(45) Date of Patent: Jun. 8, 2010

(54) FISH LURE WITH HORN-SHAPED APPENDAGES

(76) Inventor: Glenn R. Gros, 2531 Rourke Dr., Aurora, IL (US) 60503

(*) Notice: Subject to any disclaimer, the term of this patent is extended or adjusted under 35 U.S.C. 154(b) by 0 days.

(21) Appl. No.: 12/166,219

(22) Filed: Jul. 1, 2008

(51) Int. Cl.
*A01K 85/00* (2006.01)
(52) U.S. Cl. ..................... 43/42.26; 43/42.24
(58) Field of Classification Search .............. 43/42.24, 43/42.26, 42.28, 42.27, 42.29; D22/132
See application file for complete search history.

(56) References Cited

U.S. PATENT DOCUMENTS

| | | | | | |
|---|---|---|---|---|---|
| D239,447 | S | * | 4/1976 | Radcliff | D22/127 |
| D240,426 | S | * | 7/1976 | Haven | D22/132 |
| D243,176 | S | * | 1/1977 | Carver et al. | D22/132 |
| D255,593 | S | * | 6/1980 | Hunter | D22/132 |
| D272,463 | S | * | 1/1984 | Haven | D22/132 |
| 4,619,069 | A | * | 10/1986 | Strickland | 43/42.26 |
| 4,870,775 | A | * | 10/1989 | Schrader | 43/42.02 |
| D305,258 | S | * | 12/1989 | Bybee | D22/132 |
| 5,009,024 | A | * | 4/1991 | Parman | 43/42.3 |
| D354,329 | S | * | 1/1995 | Long | D22/132 |
| 5,438,790 | A | * | 8/1995 | Rigney | 43/42.24 |
| 5,996,271 | A | * | 12/1999 | Packer | 43/42.24 |
| D424,654 | S | * | 5/2000 | Canales | D22/132 |
| D526,697 | S | * | 8/2006 | Meroney | D22/132 |

* cited by examiner

*Primary Examiner*—Christopher P Ellis

(57) ABSTRACT

A fish lure constructed of an elongated curvelinear cylindrical body that has a front end and a rear end, two horn-shaped appendages each emanating from the front end of the cylindrical body at 180° apart with horn openings facing the front end, and two horn-shaped appendages each emanating from the rear end of the cylindrical body at 180° apart with horn openings facing the front end.

4 Claims, 2 Drawing Sheets

FISH LURE WITH HORN-SHAPED APPENDAGES

FIELD OF THE INVENTION

The present invention generally relates to a sporting accessory and more particularly, relates to a fish lure that has horn-shaped appendages.

BACKGROUND OF THE INVENTION

Fishing is one of the most popular sporting activities in the country and even worldwide. One of the most importance accessories used in fishing, other than the fishing pole itself, is the fishing lure. The fishing lure must be designed such that it looks attractive to a fish and inviting for the fish to bite. It is therefore important to design a fish lure that appears to be a live bait that moves in the water. It is therefore desirable to provide a fish lure that appears to be a live bait when sinking in the water or being pulled in the water.

It is therefore an object of the present invention to provide a fish lure that does not have the drawbacks or shortcomings of the conventional fishing lure.

It is another object of the present invention to provide a fish lure that is equipped with horn-shaped appendages such that it appears as live bait in the water.

SUMMARY OF THE INVENTION

In accordance with the present invention, a fish lure that is equipped with horn-shaped appendages is provided.

In a preferred embodiment, the present invention fish lure is constructed of an elongated, curvilinear cylindrical body that has a front end and a rear end; two horn-shaped appendages each emanating from the front end of the cylindrical body at 180° apart with horn openings facing the front end; and two horn-shaped appendages each emanating from the rear end of the cylindrical body at 180° apart with horn openings facing the front end.

BRIEF DESCRIPTION OF THE DRAWINGS

The invention will now be described, by way of example, with reference to the accompanying drawings, in which.

DETAILED DESCRIPTION OF THE PREFERRED EMBODIMENT

The present invention discloses a fish lure that is equipped with horn-shaped appendages which provides improved fishing for anglers. The present invention fish lure can be produced from soft plastic and measures about 3 inches long and about 3 inches wide. The fish lure has a main stick-like body and four horizontal, curly pedal or horn-shaped appendages that wave in the water during sinking or retrieving. The present invention fish lure therefore is a realistic display that helps to attract fish to the area and entices them to bite.

The present invention fish lure fulfills the need for a more effective fishing lure for anglers. The appealing features of the present invention fish lure are its ease of use, life like appearance, realistic design, reasonable price and ability to entice or attract fish. It provides anglers with effective life like tackle. The realistic movement and shape appearance encourages fish to investigate the lure and entice them to bite. The present invention fish lure is further adapted to a wide variety of fishing style, enabling an angler to vary his technique without having to switch lures. It is also ideal to be used by starting anglers when offered in a variety of sizes and colors.

Figure 1:
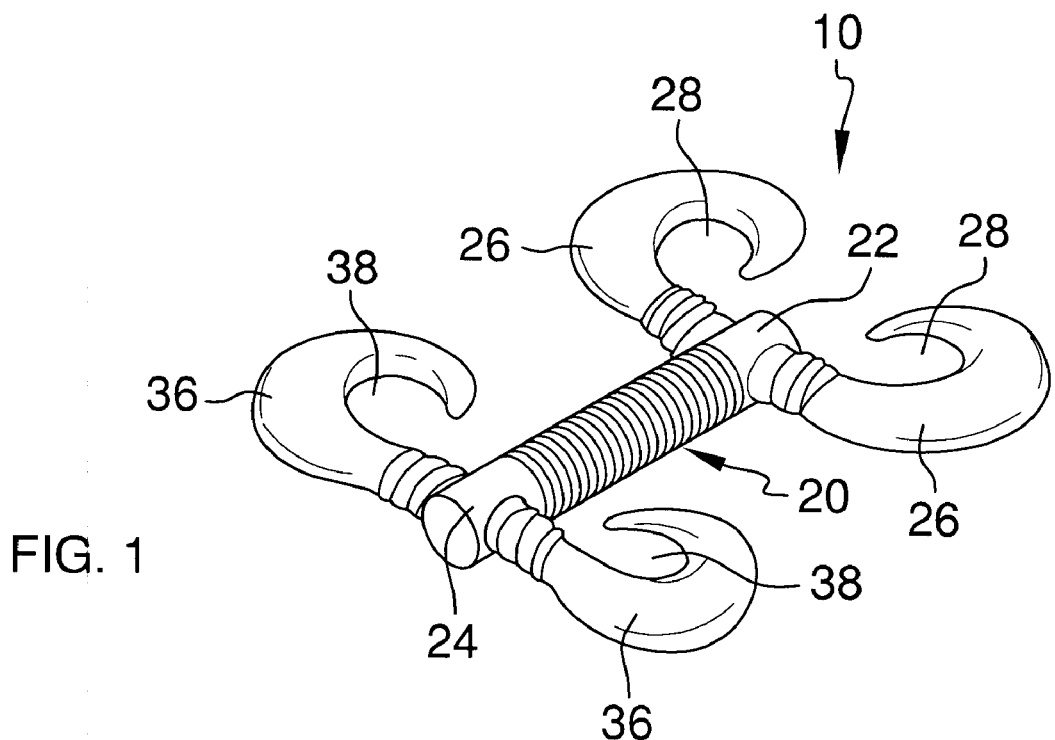
FIG. 1 is a perspective view of the top side of the present invention fish lure.
Figure 2:
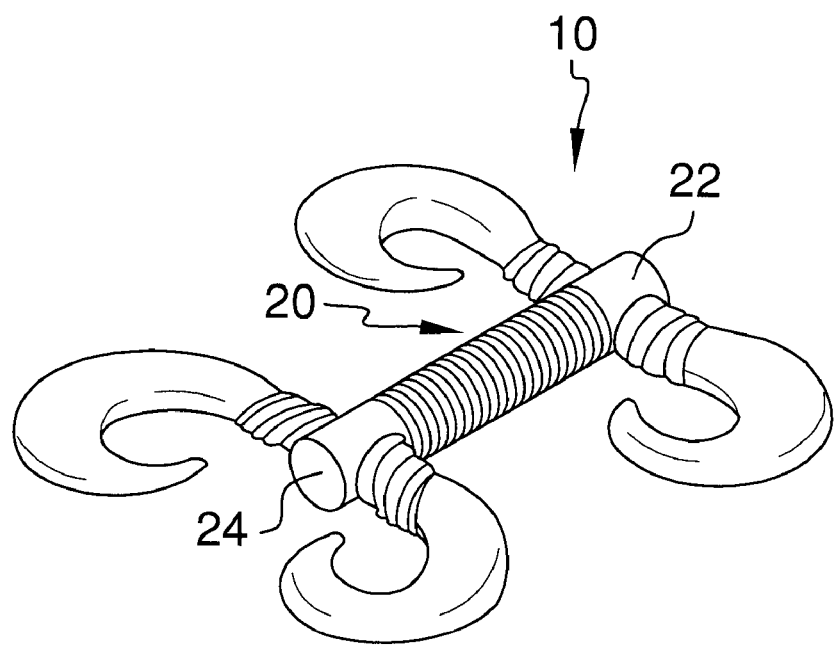
FIG. 2 is a perspective view of the bottom side of the present invention fish lure.
Figure 3:
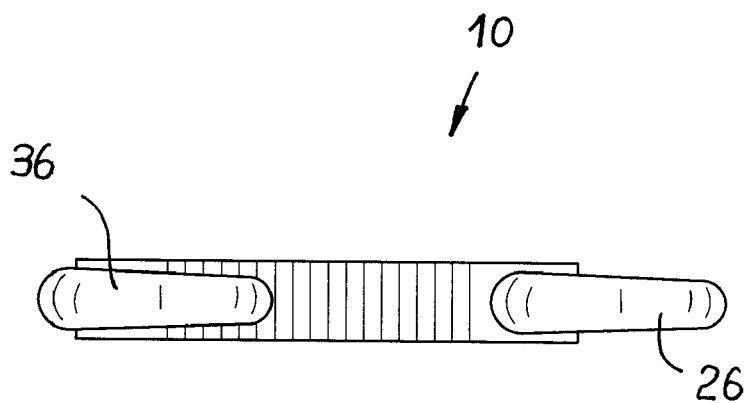
FIG. 3 is a side view of the present invention fish lure.

Referring initially to FIG. 1, wherein a perspective view of a present invention fish lure 10 is shown in a top side. A similar view is shown in FIG. 2 for the bottom side.

The present invention fish lure 10 is constructed of an elongated, curvilinear cylindrical body 20 that has a front end 22 and a rear end 24. Two horn-shaped, or pedal shaped appendages 26 each emanating from the front end 22 of the cylindrical body at 180° apart with horn openings 28 facing the front end 22.

Two other horn-shaped appendages 36 each emanating from the rear end 24 of the cylindrical body at 180° apart with horn openings 38 facing the front end 22.

Figure 4:
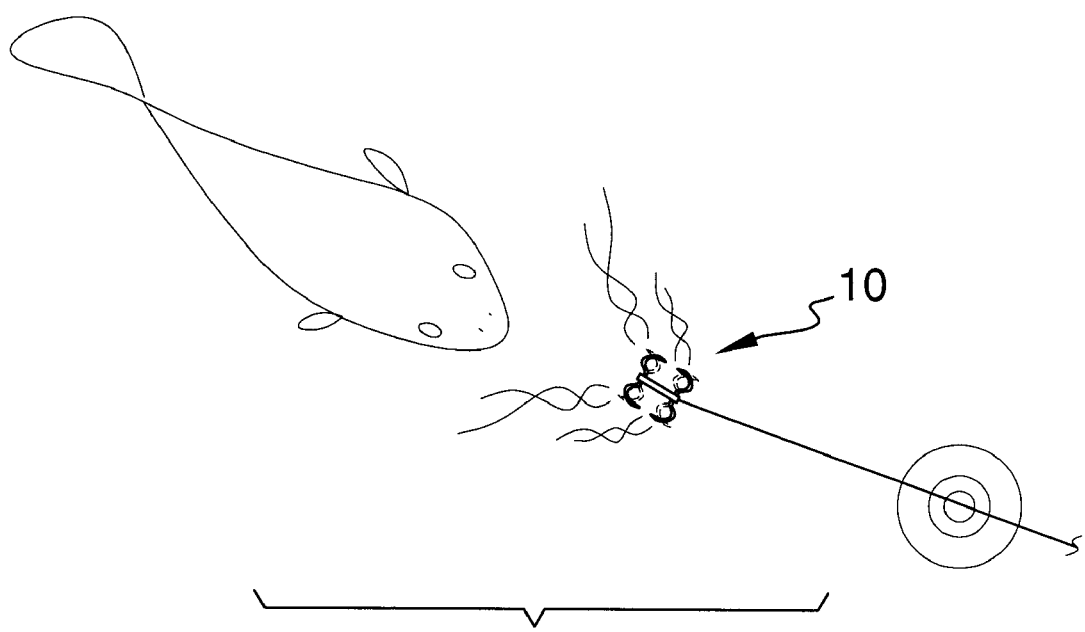
FIG. 4 illustrates how the present invention fish lure is used in fishing.

An illustration of how the present invention fish lure 10 is utilized is further shown in FIG. 4.

The present invention fish lure is a soft plastic fishing lure that is designed primarily for largemouth bass fishing. It is comprised of a slender stick-like body with four curly limbs that are arranged with the open part of the curl facing the front of the lure. The appendages are arranged with two at the rear section on opposite sides of the body and two on the front section on opposite sides of the body. The present invention is designed with both thick and thin curled appendages. The thick appendage and thin appendage types were deemed to attract fish with equal effectiveness.

As the lure is pulled through the water the curly appendages spin, creating turbulence that is picked up by the fish's lateral line. If the retrieval is stopped, the lure will sink to the bottom with the appendages fluttering slowly. This type of action will also entice a fish to strike. In fact, most strikes occurs while sinking as opposed to during retrieval. The speed which the lure will skink depends on how much weight the angler adds to the lure. The lure can be weighted in various ways in order to achieve the desired effect. On top of the lure is a small groove that allows the point of the hook to lie in, rendering it weed less and allowing quicker hook sets. The lure can be retrieved frontward or backward with equal effectiveness.

The present invention is very versatile. It can be retrieved on the surface as a "buzz bait". If retrieved at mid level the appendages create turbulence similar to a "spinner bait". If rigged with a weight it can be retrieved along the bottom like a "jig" and it also works well when retrieved across lily pads and surface scum such as a "mouse". In fact, the present invention does the job of several lures and will allow anglers to save money and room in their tackle box.

The present invention fish lure has therefore been amply described in the above descriptions and in the appended drawings of FIGS. 1-4.

While the preferred embodiments of the invention have been described above, it will be recognized and understood that various modifications can be made in the invention and the appended claims are intended to cover all such modifications which may fall within the spirit and scope of the invention.

What is claimed is:

1. A fish lure comprising:

an elongated, curvilinear body; said body consisting of a cylinder having a front end and a rear end;

two front horn-shaped appendages each extending perpendicularly from said front end of said cylindrical body at 180° apart and terminating with horn openings facing said front end; and two rear horn-shaped appendages each extending perpendicularly from said rear end of said cylindrical body at 180° apart and terminating with horn openings facing said front end.

2. The fish lure according to claim 1, wherein said elongated, curvilinear cylindrical body is formed of a pliable plastic material.

3. The fish lure according to claim 1, wherein said front and rear horn-shaped appendages are each formed of a pliable plastic material such that tips of said appendages flutters in water upon sinking or retrieving.

4. The fish lure according to claim 1, wherein each of said front and rear horn-shaped appendages has a length between 1 and 2 inches.

* * * * *